United States Patent
Negoro et al.

(10) Patent No.: US 12,275,493 B2
(45) Date of Patent: Apr. 15, 2025

(54) ELECTRIC BICYCLE, BATTERY SWITCHING DEVICE, AND METHOD OF SWITCHING BATTERY

(71) Applicant: Yamaha Hatsudoki Kabushiki Kaisha, Shizuoka (JP)

(72) Inventors: Masanori Negoro, Shizuoka (JP); Katsuro Shibahara, Shizuoka (JP); Satoshi Katayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 498 days.

(21) Appl. No.: 17/893,131

(22) Filed: Aug. 22, 2022

(65) Prior Publication Data

US 2023/0058461 A1 Feb. 23, 2023

(30) Foreign Application Priority Data

Aug. 23, 2021 (JP) .................. 2021-135954

(51) Int. Cl.
*B62M 6/45* (2010.01)
*B62J 43/13* (2020.01)
*B62M 6/55* (2010.01)

(52) U.S. Cl.
CPC ............... *B62M 6/45* (2013.01); *B62J 43/13* (2020.02); *B62M 6/55* (2013.01); *Y02T 10/70* (2013.01)

(58) Field of Classification Search
CPC .. B62M 6/45; B62M 6/55; B62J 43/13; Y02T 10/70
See application file for complete search history.

(56) References Cited

U.S. PATENT DOCUMENTS

| | | | |
|---|---|---|---|
| 9,768,625 B2 | 9/2017 | Sakakibara | |
| 2017/0229883 A1* | 8/2017 | Sugiyama | ............... B60L 58/22 |
| 2023/0406155 A1* | 12/2023 | Chon | ..................... H02J 7/0016 |

FOREIGN PATENT DOCUMENTS

| | | |
|---|---|---|
| JP | 2004359032 A | 12/2004 |
| JP | 2009183020 A | 8/2009 |
| JP | 2016019303 A | 2/2016 |

* cited by examiner

*Primary Examiner* — Sean Gugger
(74) *Attorney, Agent, or Firm* — HEA Law PLLC

(57) ABSTRACT

A control device sets a second electricity control switch in an intermediate state in a process of switching a discharge battery for supplying a drive unit with an electrical current from a first battery to a second battery. Subsequently, when a comparative relationship between an electric potential of a smoothing capacitor and an electric potential of the second battery fulfills an intermediate state termination condition, the control device sets the second electricity control switch in a bidirectional conduction state. The intermediate state is when an electrical current flowing from the second battery to the drive unit is allowed, and an electrical current flowing from the drive unit to the second battery is inhibited. The bidirectional conduction state is when both of the electrical current flowing from the second battery to the drive unit and the electrical current flowing from the drive unit to the second battery are allowed.

11 Claims, 13 Drawing Sheets

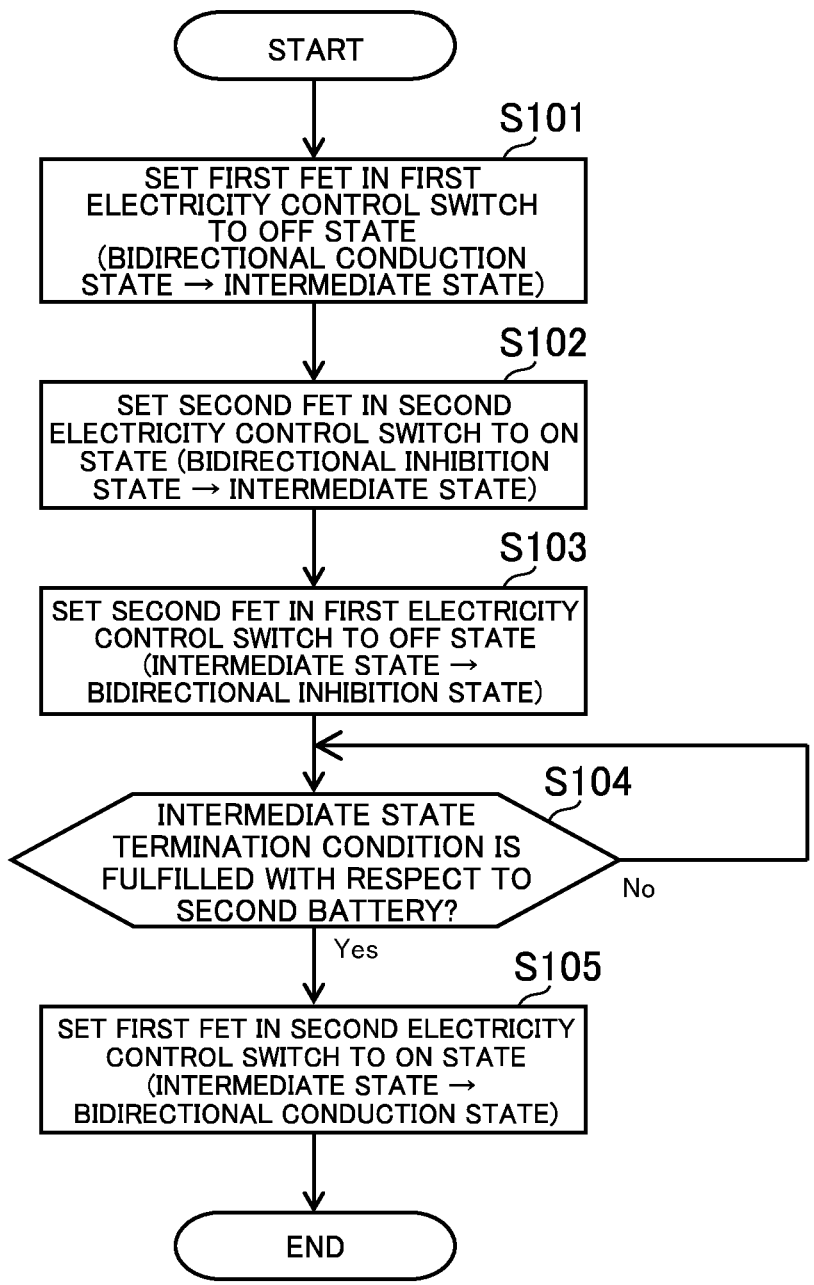

ELECTRIC BICYCLE, BATTERY SWITCHING DEVICE, AND METHOD OF SWITCHING BATTERY

CROSS-REFERENCE TO RELATED APPLICATION

The present application claims priority from Japanese application JP 2021-135954 filed on Aug. 23, 2021, the content of which is hereby incorporated by reference into this application.

BACKGROUND OF THE INVENTION

1. Field of the Invention

The present disclosure relates to an electric bicycle, a battery switching device, and a method of switching between batteries.

2. Description of the Related Art

JP 2004-359032 A discloses an electric bicycle which is equipped with two batteries. This bicycle has a switching unit for switching batteries for supplying electrical power to an electric motor. The switching unit is disposed between the batteries and a drive unit including the electric motor. The switching unit is constituted by a field-effect transistor (FET).

In general, an electric output potential (a voltage at a positive terminal) of the battery drops in accordance with a decrease in remaining charge of the battery. In the electric bicycle having the two batteries, when the battery that supplies the drive unit with the electric power is switched from the battery high in output electric potential to the battery low in output electric potential, an electric potential of the drive unit can temporarily become higher than the electric potential of the battery to be switched for supplying the electric power. On that occasion, there occurs an electrical current from the drive unit to the battery. Such an electrical current has a possibility of harming the operation of the battery.

SUMMARY OF THE INVENTION (1) An example of an electric bicycle proposed in the present disclosure includes a first battery, a second battery, a drive unit including an electric motor, and a battery switching device arranged between the first battery and the second battery, and the drive unit. The battery switching device has a first electricity control switch disposed between the first battery and the drive unit, a second electricity control switch disposed between the second battery and the drive unit, and a control device configured to control the first electricity control switch and the second electricity control switch. The second electricity control switch has a bidirectional conduction state, an intermediate state, and a bidirectional inhibition state. The bidirectional conduction state allows both of an electrical current flowing from the second battery to the drive unit and an electrical current flowing from the drive unit to the second battery. The intermediate state allows the electrical current flowing from the second battery to the drive unit and inhibits the electrical current flowing from the drive unit to the second battery. The bidirectional inhibition state inhibits both of the electrical current flowing from the second battery to the drive unit and the electrical current flowing from the drive unit to the second battery. In a process of switching a battery that supplies the drive unit with an electrical current from the first battery to the second battery, the control device sets the second electricity control switch in the intermediate state, and then sets the second electricity control switch in the bidirectional conduction state when a comparative relationship between an electric potential of the drive unit and an electric potential of the second battery fulfills a predetermined condition. According to this electric bicycle, it is possible to prevent the electrical current from the drive unit to the second battery from occurring.

(2) The electric bicycle as in (1) can further include a current detector configured to detect an electrical current flowing between the second battery and the drive unit. The control device determines whether or not the comparative relationship between the electric potential of the drive unit and the electric potential of the second battery fulfills the predetermined condition based on an output of the current detector.

(3) The electric bicycle as in (1) can further include a battery voltage detector configured to detect the electric potential of the second battery; and a drive unit voltage detector configured to detect the electric potential of the drive unit. The control device determines whether or not the comparative relationship between the electric potential of the drive unit and the electric potential of the second battery fulfills the predetermined condition based on an output of the battery voltage detector and an output of the drive unit voltage detector.

(4) In the electric bicycle as in (3), the predetermined condition is that a difference between the electric potential of the drive unit and the electric potential of the second battery is smaller than a threshold value. According to the above, it becomes possible to reduce the time required for the predetermined condition to be fulfilled.

(5) In the electric bicycle as described in any one of (1) through (3), the predetermined condition is that the electric potential of the second battery is equal to the electric potential of the drive unit, or higher than the electric potential of the drive unit.

(6) In the electric bicycle as described in any one of (1) through (5), in the process of switching the battery that supplies the drive unit with the electrical current from the first battery to the second battery, the control device changes the first electricity control switch from the bidirectional conduction state to the intermediate state, and changes the second electricity control switch from the bidirectional inhibition state to the intermediate state.

(7) In the electric bicycle as described in any one of (1) through (6), the drive unit has a motor drive device configured to supply the electric motor with an electrical current, and a smoothing capacitor coupled in parallel to the motor drive device. According to the above, it is possible to reduce a fluctuation of the electrical current supplied to the motor drive device.

(8) The electric bicycle as described in any one of (1) through (7) can further include an input part for a user to operate. The control device switches the battery that supplies the drive unit with an electrical current between the first battery and the second battery based on a signal input from the input part. According to the above, it becomes easy for the user to preferentially use, for example, one of the batteries to reduce the remaining charge of the battery to the amount suitable for charging.

(9) In the electric bicycle as described in any one of (1) through (8), each of the first electricity control switch and the second electricity control switch includes a first field effect transistor (a first FET) configured to allow the electrical current from the battery to the drive unit in an ON state, and a second field effect transistor (a second FET) configured to allow the electrical current from the drive unit to the battery in an ON state. The first FET and the second FET are arranged in series so that forward directions of body diodes of the first FET and the second FET are opposite to each other. According to the above, since the intermediate state can be realized using the body diodes of the FET, it is possible to reduce the number of components.

(10) A battery switching device proposed in the present disclosure includes a first battery and a second battery, and a drive unit of an electric bicycle, the battery switching device comprising: a first electricity control switch disposed between the first battery and the drive unit; a second electricity control switch disposed between the second battery and the drive unit; and a control device configured to control the first electricity control switch and the second electricity control switch. The second electricity control switch has a bidirectional conduction state that allows both of an electrical current flowing from the second battery to the drive unit and an electrical current flowing from the drive unit to the second battery, an intermediate state that allows the electrical current flowing from the second battery to the drive unit, and inhibits the electrical current flowing from the drive unit to the second battery, and a bidirectional inhibition state that inhibits both of the electrical current flowing from the second battery to the drive unit and the electrical current flowing from the drive unit to the second battery. In a process of switching a battery that supplies the drive unit with an electrical current from the first battery to the second battery, the control device sets the second electricity control switch in the intermediate state, and then sets the second electricity control switch in the bidirectional conduction state when a comparative relationship between an electric potential of the drive unit and an electric potential of the second battery fulfills a predetermined condition. According to this battery switching device, it is possible to prevent electrical current flowing from the drive unit to the second battery.

(11) In a method of switching between batteries proposed in the present disclosure, a second electricity control switch makes the transition from a bidirectional inhibition state to an intermediate state, where the bidirectional inhibition state inhibits both of an electrical current flowing from the second battery to the drive unit and an electrical current flowing from the drive unit to the second battery, and where the intermediate state allows the electrical current flowing from the second battery to the drive unit and inhibits the electrical current flowing from the drive unit to the second battery. Subsequently, the second electricity control switch makes the transition from the intermediate state to a bidirectional conduction state, where the bidirectional conduction state allows both of the electrical current flowing from the second battery to the drive unit and the electrical current flowing from the drive unit to the second battery when a comparative relationship between an electric potential of the drive unit and an electric potential of the second battery fulfills a predetermined condition.

It should be noted that the electric bicycle proposed in the present disclosure can be a bicycle which runs with a combination of the force applied to the pedal by the rider and the force output from the electric motor, or can also be a bicycle which can run only with the force applied to the pedal by the rider, or only with the force output from the electric motor in accordance with the selection by the rider.

BRIEF DESCRIPTION OF THE DRAWINGS

FIG. 5 is a flowchart showing an example of processing performed by the control device (a switching execution section).

DETAILED DESCRIPTION OF THE INVENTION

Figure 1:
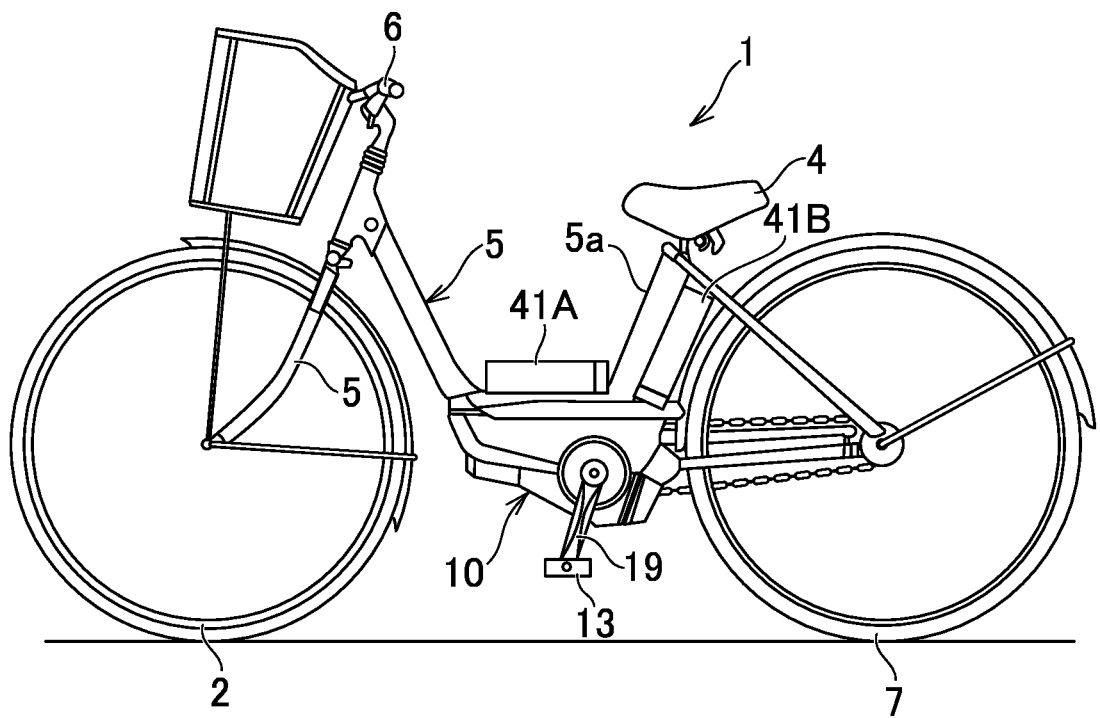
FIG. 1 is a left side view showing an example of an electric bicycle proposed in the present disclosure.
Figure 2:
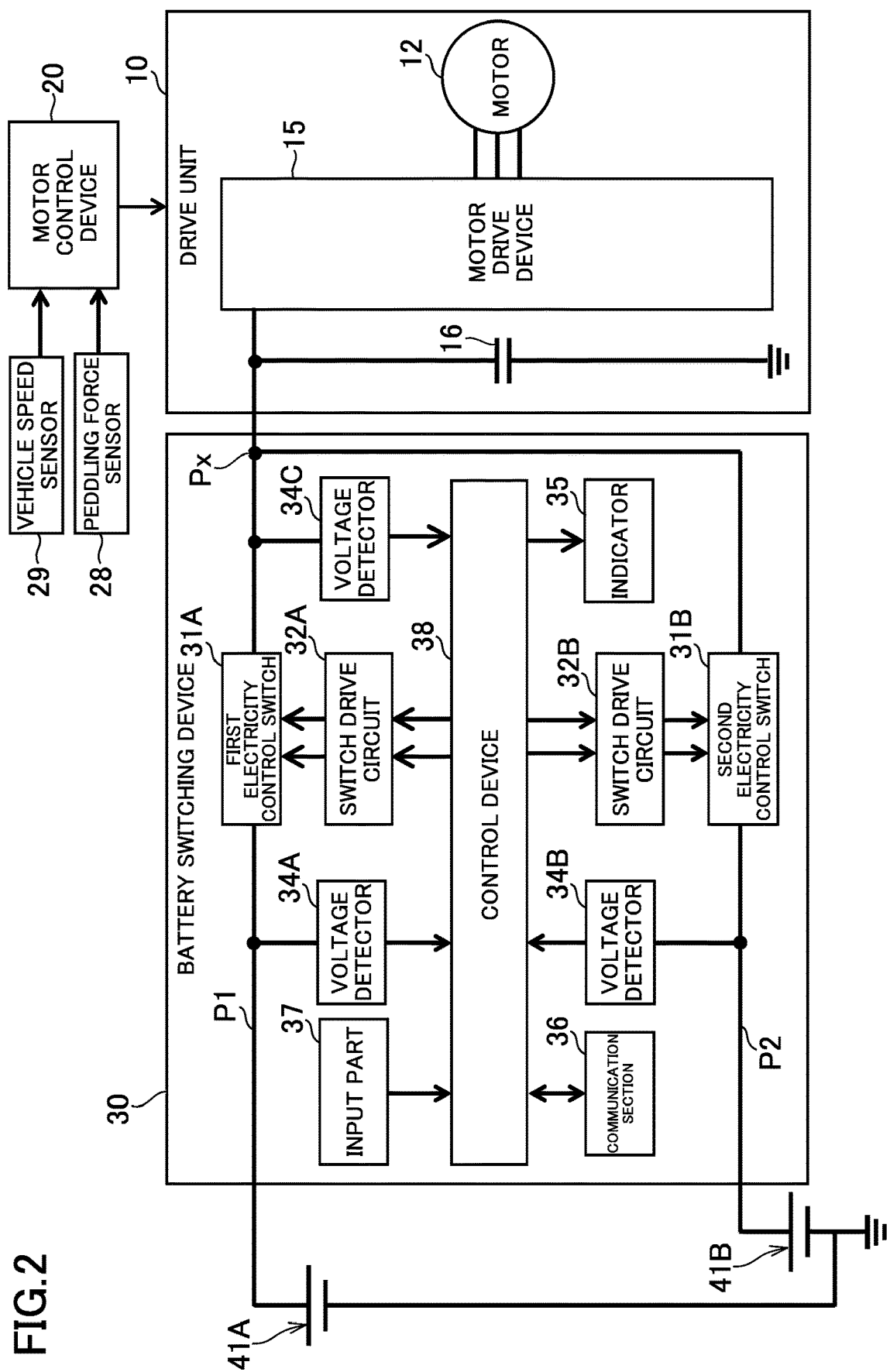
FIG. 2 is a block diagram showing hardware of the electric bicycle.

In the following, an example of an electric bicycle proposed in the present disclosure will be described. FIG. 1 is a left side view of an electric bicycle 1 as an example of the electric bicycle proposed in the present disclosure. FIG. 2 is a block diagram showing hardware of the electric bicycle 1.

As shown in FIG. 1, the electric bicycle 1 has a front wheel 2, a front fork 5, a handlebar 6, a saddle 4, a body frame 5, and a rear wheel 7, wherein the front fork 5 supports the front wheel 2, the handlebar 6 is fixed to an upper portion of the front fork 5, and the body frame 5 has a saddle post 5a which supports the saddle 4.

[Drive Unit]

The electric bicycle 1 has a drive unit 10 including an electric motor 12 (see FIG. 2) and a reduction mechanism which reduces a rotational speed output from the electric motor 12 to output the result. The drive unit 10 is disposed, for example, below the saddle post 5a. The position of the drive unit 10 is not limited to the example shown in the drawing. The drive unit 10 is provided with a crankshaft. To the crankshaft, there are coupled crank arms 19. To a tip of the crank arm 19, there is attached a pedal 13. The drive unit 10 combines a force (a peddling force) applied to the pedal 13 and a force output by the electric motor 12, with each other. For example, the force (the peddling force) applied to the pedal 13 and the force output by the electric motor 12 are input to a rotational shaft constituting the reduction mechanism, and thus, the two forces are combined with each other. An output (a rotation) of the drive unit 10 is transmitted to the rear wheel 7 via a transmission member such as a chain, a belt, or a shaft.

As shown in FIG. 2, the drive unit 10 has a motor drive device 15 and a smoothing capacitor 16 in addition to the electric motor 12 described above. Further, the electric bicycle 1 has a plurality of batteries 41A and 41B, a battery switching device 30, and a motor control device 20. The battery switching device 30 is disposed between the plurality of batteries 41A and 41B and the motor drive device 15, and the electrical current of the batteries 41A and 41B is supplied to the motor drive device 15 through the battery switching device 30.

The batteries 41A and 41B store electrical power to be supplied to the electric motor 12. The batteries 41A and 41B can be, for example, a lithium-ion battery or a nickel hydride battery. The number of the batteries 41A and 41B is, for example, two as shown in the drawings, but can also be three or more. It should be noted that in the following description, when discriminating the two batteries 41A and 41B from each other, the battery 41A is referred to as a "first battery," and the battery 41B is referred to as a "second battery."

The batteries 41A and 41B are allowed to be individually attached detachably to the electric bicycle 1. In other words, it is possible to arrange that only the second battery 41B is allowed to be detached from the electric bicycle 1 in a state in which the first battery 41A is installed in the electric bicycle 1, and conversely, only the first battery 41A is allowed to be detached from the electric bicycle 1 in a state in which the second battery 41B is installed in the electric bicycle 1. The batteries 41A and 41B may be charged through a charger in a state of being detached from the electric bicycle 1.

In the example shown in FIG. 1, the second battery 41B is arranged along a rear side of the saddle post 5a, and the first battery 41A is arranged at a front side of the saddle post 5a. At positions where the batteries 41A and 41B are arranged, there can be arranged receptacles to which the batteries 41A and 41B can be attached detachably and which have terminals for establishing electrical connection to the batteries 41A and 41B, respectively. The arrangement of the batteries 41A and 41B is not limited to the example shown in FIG. 1, but can arbitrarily be modified.

Each of the batteries 41A and 41B can be provided with a temperature detector, a voltage detector, a current detector, and a control device (not shown), wherein the temperature detector monitors the temperature of a battery cell provided inside, the voltage detector detects a voltage of the battery cell, the current detector detects an electrical current when performing charge or discharge, and the control device monitors the temperature, the voltage, the electrical current, and the remaining charge of the battery based on outputs of these detectors. The batteries 41A and 41B may include a communication module for communicating with the battery switching device 30.

The motor drive device 15 supplies the electric motor 12 with the electrical current corresponding to a command value input from the motor control device 20. The motor drive device includes, for example, an inverter circuit, and converts a DC current supplied from the batteries 41A and 41B into an AC current to supply the result to the electric motor 12.

The smoothing capacitor 16 is coupled in parallel to the motor drive device 15. When the electrical current is supplied to the motor drive device 15 from the batteries 41A and 41B via the battery switching device 30, the charge is accumulated in the smoothing capacitor 16. The smoothing capacitor 16 reduces a fluctuation of the electrical current supplied to the motor drive device 15.

The motor control device 20 includes a storage device such as a RAM (Random Access Memory) or a ROM (Read Only Memory), and an arithmetic device such as a CPU (Central Processing Unit). The motor control device 20 executes a program stored in the storage device in the arithmetic device to thereby control the electric motor 12. Specifically, the motor control device 20 calculates a command value corresponding to the speed of the electric bicycle 1 and the force (the peddling force) applied to the pedal 13, and then outputs the command value to the motor drive device 15. A vehicle speed sensor 29 and a peddling force sensor 28 are coupled to the motor control device 20. The motor control device 20 can be an FPGA (Field-Programmable Gate Array).

[Battery Switching Device]

As shown in FIG. 2, the battery switching device 30 has power lines P1 and P2 for coupling the respective batteries 41A and 41B and the motor drive device 15 to each other. The power lines P1 and P2 are respectively coupled to the two receptacles (not shown) to which the two batteries 41A and 41B can detachably be attached. The receptacles may include terminals for the power lines P1 and P2, and terminals for communication lines (not shown). Further, the battery switching device 30 has a coupling point Px to which the power lines P1 and P2 are coupled. The battery switching device 30 may include a connector to electrically couple to the drive unit 10. The connector may include a terminal which is coupled to the coupling point Px, and which is common to the two power lines P1 and P2.

The battery switching device 30 switches the battery which discharges toward the drive unit 10 from one of the batteries 41A and 41B to the other in accordance with an instruction by a user (a rider) and running circumstances. The battery in the state of discharging toward the drive unit 10 is hereinafter referred to as the "discharge battery."

As shown in FIG. 2, the battery switching device 30 has electricity control switches 31A and 31B, switch drive circuits 32A and 32B, and a control device 38. Further, the battery switching device 30 may include voltage detectors 34A, 34B, and 34C, an indicator 35, a communication section 36, and an input part 37.

The first electricity control switch 31A is located between the first battery 41A and the drive unit 10, and is coupled in series to the first battery 41A. The first electricity control switch 31A controls the electrical current flowing between the first battery 41A and the drive unit 10 in accordance with a command from the control device 38. Similarly, the second electricity control switch 31B is located between the second battery 41B and the drive unit 10, and is coupled in series to the second battery 41B. The second electricity control switch 31B controls the electrical current flowing between the second battery 41B and the drive unit 10 in accordance with a command from the control device 38.

Figure 3:
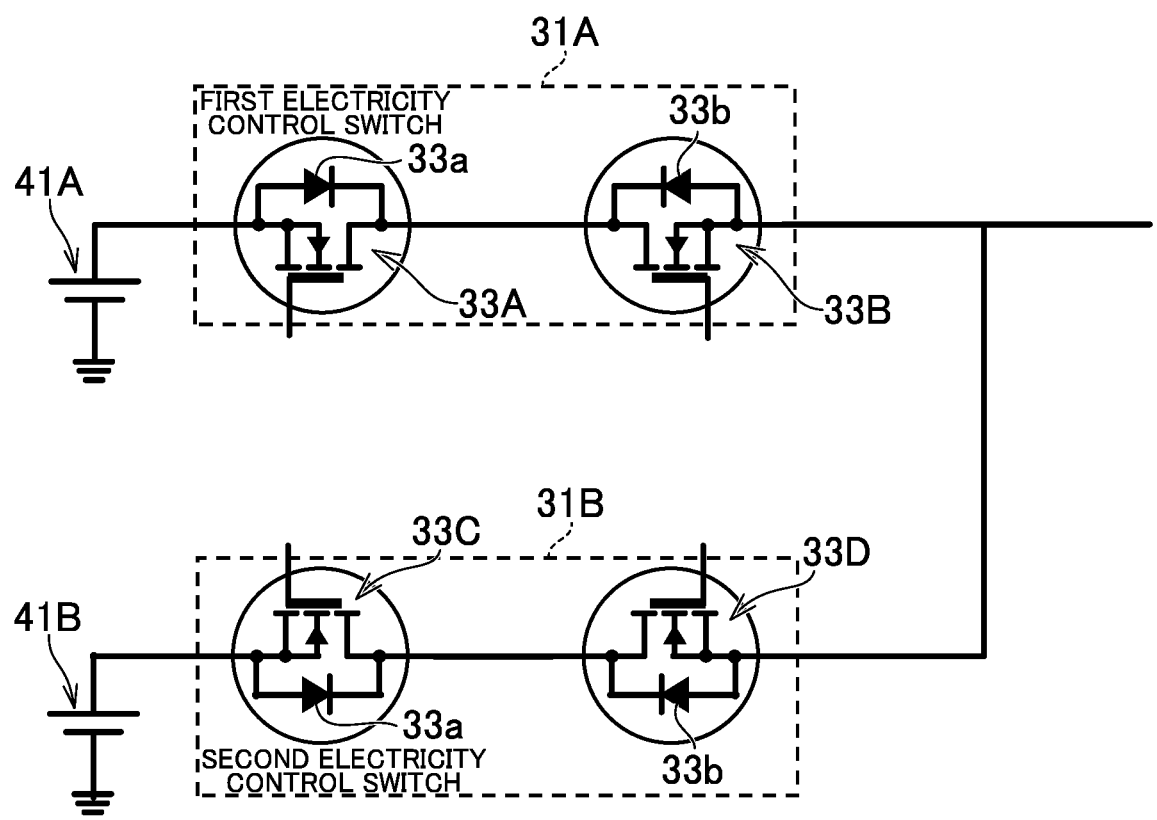
FIG. 3 is a diagram showing an electricity control switch provided to a battery switching device.

FIG. 3 is a diagram showing the electricity control switches 31A and 31B. As shown in that drawing, the first electricity control switch 31A has, for example, a first field-effect transistor (a first FET) 33A, and a second field-effect transistor (a second FET) 33B. In the first electricity control switch 31A, the two FETs 33A and 33B are coupled in series to each other, and the forward directions of body diodes 33a and 33b thereof are made opposite to each other. In the example shown in the drawings, a drain of the first FET 33A and a drain of the second FET 33B are coupled to each other. Unlike the above, a source of the first FET 33A and a source of the second FET 33B may be coupled to each other. Similarly, the second electricity control switch 31B also has a first FET 33C and a second FET 33D. In the second electricity control switch 31B, the two FETs 33C and 33D are coupled in series to each other, and the forward directions of body diodes 33a and 33b thereof are made opposite to each other. The FETs 33A through 33D are each N-channel FETs in the example shown in the drawings, but may be P-channel FETs.

The switch drive circuit 32A (see FIG. 2) controls a gate voltage of each of the FETs 33A and 33B coupled to the first battery 41A in accordance with a signal input from the control device 38. Similarly, the switch drive circuit 32B controls a gate voltage of each of the FETs 33C and 33D coupled to the battery 41B in accordance with a signal input from the control device 38.

The control device 38 includes a storage device such as a RAM or a ROM, and an arithmetic device such as a CPU. The motor control device 20 executes a program stored in the storage device in the arithmetic device to thereby control the electricity control switches 31A and 31B. Processing to be executed by the control device 38 will be described later in detail. The control device 38 can be an FPGA.

The indicator 35 may include, for example, a plurality of light emitting elements (e.g., LED). The control device 38 controls the indicator 35 to show the states of the batteries 41A and 41B. For example, the control device 38 may show the battery (the discharge battery) which is supplying the electrical current to the drive unit 10 with the indicator 35, or show operational states of the batteries 41A and 41B. The operational states of the batteries 41A and 41B may be, for example, the remaining charge, errors in voltage or temperature, and so on, of the batteries 41A and 41B.

The communication section 36 may be a communication module for communicating with the control devices incorporated in the batteries 41A and 41B. The control device 38 of the battery switching device 30 may receive the information of the batteries 41A and 41B such as the voltages (the electric potentials at the positive terminals), the temperatures of the battery cells, the discharge currents, and the remaining charge of the batteries 41A and 41B from the batteries 41A and 41B via the communication section 36.

Further, the communication section 36 may include a communication module that communicates with the motor control device 20. The control device 38 may transmit the information of the batteries 41A and 41B to the motor control device 20 through the communication section 36.

As described above, the battery switching device 30 may relay the information of the batteries 41A and 41B between the batteries 41A and 41B and the motor control device 20. Further, the battery switching device 30 may be coupled to the motor drive device 15 via a terminal (a terminal located at the drive unit 10 side of the coupling point Px) common to the two power lines P1 and P2. According to the above, the battery switching device 30 can operate as an adapter device which makes the plurality of batteries 41A and 41B function as if the batteries 41A and 41B were a single battery. The battery switching device 30 may be housed in a different housing from those for the batteries 41A and 41B and the drive unit 10.

The input part 37 shown in FIG. 2 is, for example, a switch which can manually be operated by the user. The user is allowed to input a battery switching instruction through the input part 37. Specifically, when the first battery 41A is used as the discharge battery, the user is allowed to operate the input part 37 to instruct, to the control device 38, the switching of the discharge battery from the first battery 41A to the second battery 41B. Conversely, when the second battery 41B is used as the discharge battery, the user is allowed to operate the input part 37 to instruct, to the control device 38, the switching of the discharge battery from the second battery 41B to the first battery 41A. The electric bicycle 1 may have a structure where three or more batteries are equipped. In this case, the user may be allowed to select the discharge battery from the three or more batteries with an operation on the input part 37. In other words, the input part 37 may input a battery selection instruction to the control device 38.

The voltage detector 34A is a circuit for outputting a signal corresponding to an output voltage (e.g., an electric potential at the positive terminal) of the first battery 41A. The voltage detector 34B is a circuit for outputting a signal corresponding to an output voltage (e.g., an electric potential at the positive terminal) of the second battery 41B. The voltage detector 34C is a circuit for outputting a signal corresponding to an electric potential (an electric potential at a positive terminal of the drive unit 10, that is, an electric potential at a positive terminal of the smoothing capacitor 16 in the present embodiment) of the drive unit 10.

The battery switching device 30 may have the voltage detectors 34A, 34B, and 34C in a housing which houses the power lines P1 AND P2, the control device 38, and so on. This arrangement allows a reduction in the time necessary for the control device 38 to obtain the information of the electric potential.

Unlike the example shown in the drawings, the voltage detectors 34A and 34B may be installed in the batteries 41A and 41B, respectively, instead of the battery switching device 30. In this case, the control device 38 may receive the information of the output voltages of the batteries 41A and 41B from the batteries 41A and 41B via the communication section 36.

Similarly, the voltage detector 34C may be provided to the drive unit 10, and the control device 38 may receive the information of the electric potential (the electric potential of the positive terminal of the smoothing capacitor 16) of the drive unit 10 from the drive unit 10 (or the motor control device 20) via the communication section 36.

[Control Device in Battery Switching Device]

Figure 4:
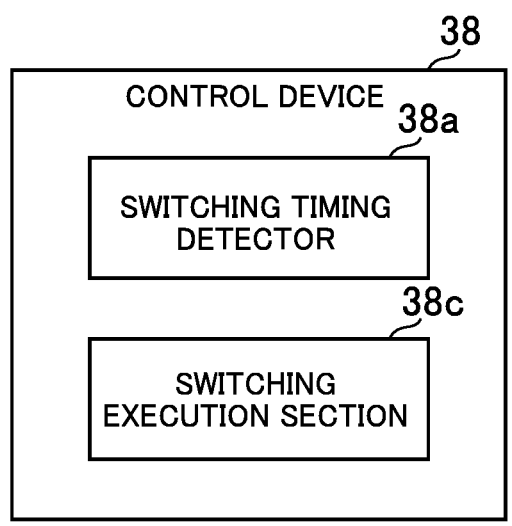
FIG. 4 is a block diagram showing functions provided to a control device provided to the battery switching device.

FIG. 4 is a block diagram showing functions provided to the control device 38. As shown in that drawing, the control device 38 has a switching timing detector 38a and a switching execution section 38c as the functions of the control device 38.

[Switching Timing Detector]

The switching timing detector 38a detects a timing of switching the discharge battery (the battery for supplying the drive unit 10 with the electrical current) from one of the plurality of batteries 41A and 41B to another thereof.

The switching timing detector 38a may detect the timing of switching the discharge battery based on, for example, a signal (a battery switching instruction) input from the input part 37. The user is allowed to switch the discharge battery at an arbitrary timing. For example, the user is allowed to switch the discharge battery to the battery higher in remaining charge through the input part 37 when the remaining charge of the present discharge battery becomes low. Conversely, the user is allowed to switch the discharge battery from the battery higher in remaining charge to the battery lower in remaining charge. Further, the communication section 36 may communicate with a mobile terminal owned by the user. In this case, the control device 38 may receive the battery switching instruction from the mobile terminal.

Further, the switching timing detector 38a may detect the timing of switching the discharge battery based on the information of the batteries 41A and 41B received from the communication section 36. For example, the switching timing detector 38a may determine that the timing of switching the discharge battery has come when the remaining charge of the battery has become lower than a threshold value, or when the temperature of the battery cell has become abnormal.

[Switching Execution Section]

When the switching timing of the discharge battery has been detected in the switching timing detector 38a, the switching execution section 38c operates the electricity control switches 31A and 31B to switch the discharge battery from one of the plurality of batteries 41A and 41B to another thereof. The electricity control switches 31A and 31B each have a bidirectional conduction state, an intermediate state, and a bidirectional inhibition state. In the process of switching the discharge battery, the switching execution section 38c changes the states of the electricity control switches 31A and 31B to these three states in series.

Figure 6A:
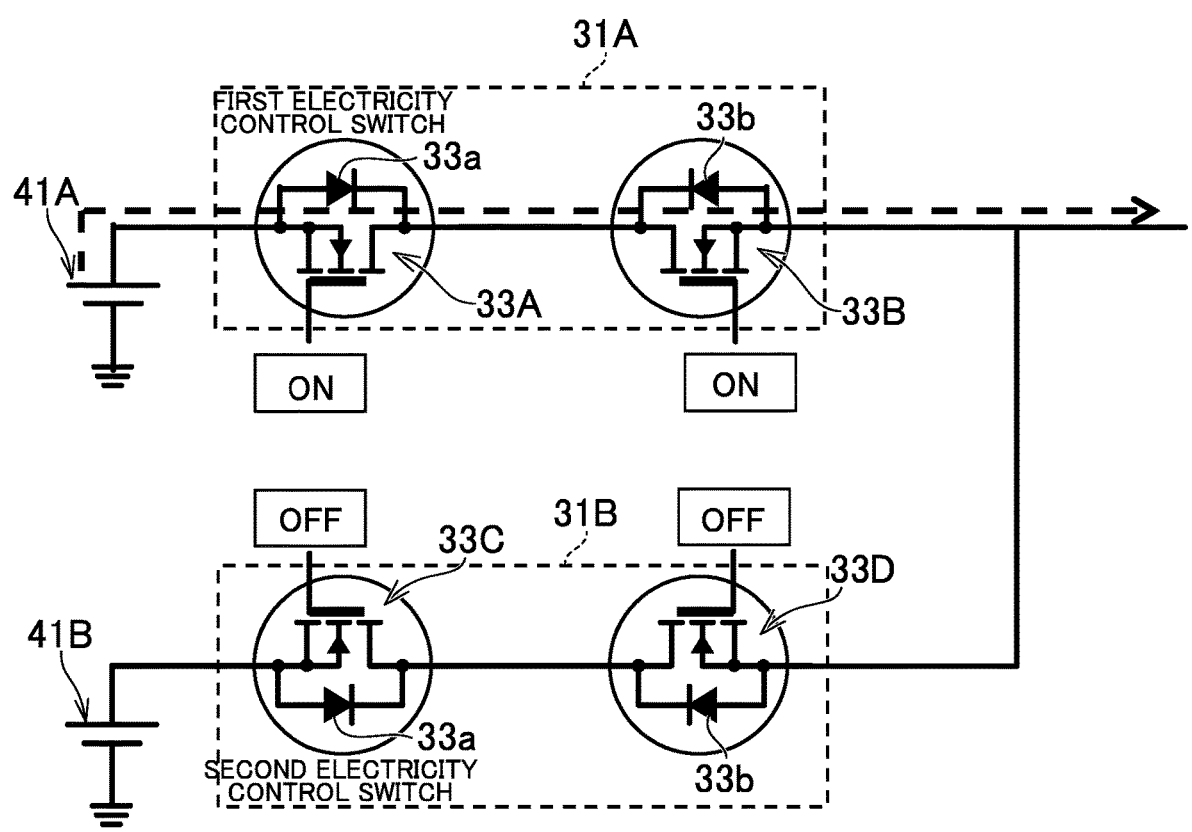
FIG. 6A is a diagram for explaining a process of switching a battery (a discharge battery) for supplying a drive unit with an electrical current from a first battery to a second battery.

In the bidirectional conduction state, the first electricity control switch 31A allows both of an electrical current flowing from the first battery 41A toward the drive unit 10 and an electrical current flowing from the drive unit 10 toward the first battery 41A. For example, as shown in FIG. 6A, when both of the two FETs 33A and 33B are in an ON state, the bidirectional conduction state is realized. Similarly, the bidirectional conduction state of the second electricity control switch 31B is also realized when, for example, both of the two FETs 33C and 33D are in the ON state.

Figure 6B:
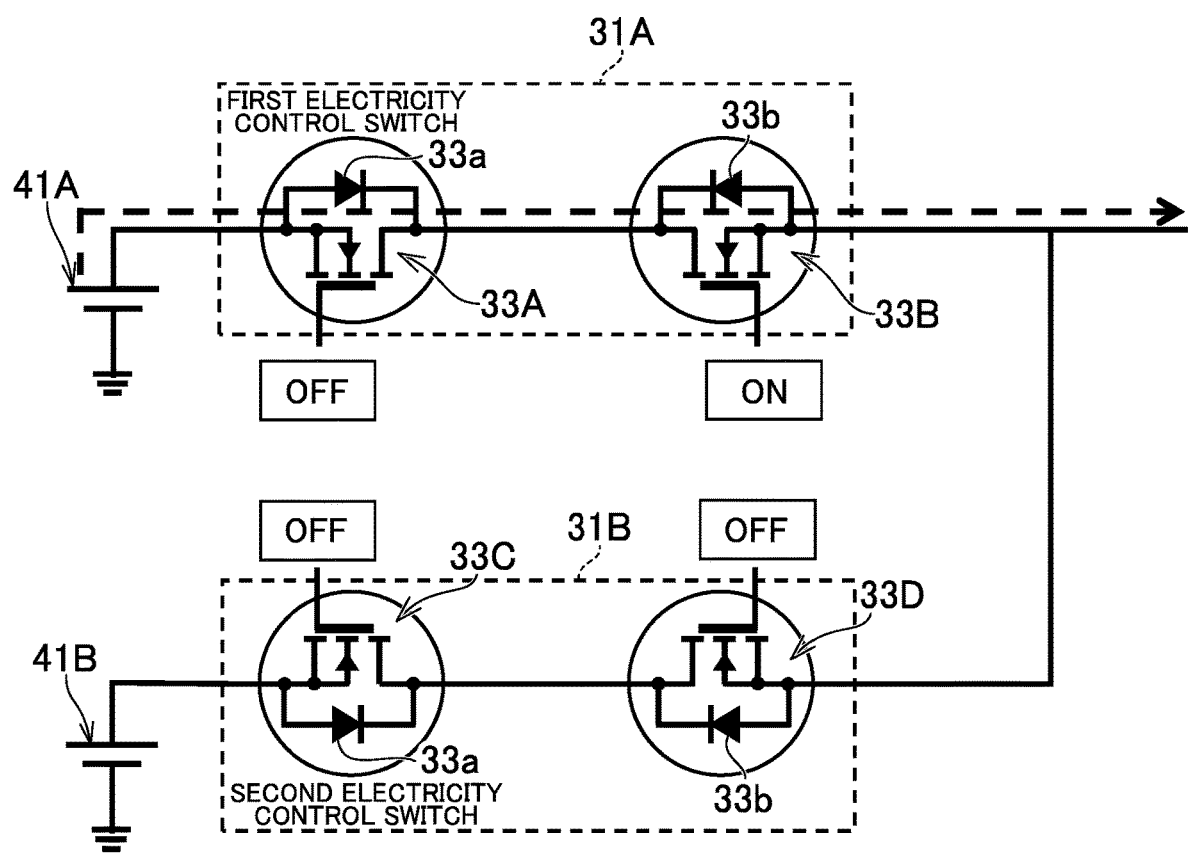
FIG. 6B is a diagram for explaining the process of switching the discharge battery from the first battery to the second battery.

In the bidirectional inhibition state, the first electricity control switch 31A inhibits both of the electrical current flowing from the first battery 41A toward the drive unit 10 and the electrical current flowing from the drive unit 10 toward the first battery 41A. For example, as shown in FIG. 6D and FIG. 6E, when both of the two FETs 33A and 33B are in an OFF state, the bidirectional inhibition state is realized. Similarly, the bidirectional inhibition state of the second electricity control switch 31B is also realized when, for example, both of the two FETs 33C and 33D are in the OFF state.

In the intermediate state, the first electricity control switch 31A allows the electrical current (discharged current) flowing from the first battery 41A toward the drive unit 10, and simultaneously inhibits the electrical current (charged current) flowing from the drive unit 10 toward the first battery 41A. For example, as shown in FIG. 6B, when the first FET 33A in which the forward direction of the body diode 33a is the direction from the battery 41A toward the drive unit 10 is set in the OFF state, and the second FET 33B in which the forward direction of the body diode 33b is the direction from the drive unit 10 toward the first battery 41A is set in the ON state, the intermediate state is realized. In this state, the electrical current from the first battery 41A toward the drive unit 10 flows through the body diode 33a in the first FET 33A, and flows through the channel in the second FET 33B. Regarding the electricity control switch 31B, when setting the first FET 33C in the OFF state, and setting the second FET 33D in the ON state, the intermediate state is realized.

In the process of switching the discharge battery, the drive unit 10 temporarily becomes higher in electric potential than the batteries 41A and 41B in some cases. In the example shown in the drawings, the smoothing capacitor 16 installed to the drive unit 10 may provide a cause for the above. In general, the output voltage of a battery drops when the remaining charge of the battery lowers. The smoothing capacitor 16 stores the electrical charge corresponding to the output voltage of the present discharge battery (the discharge battery before switching). When the discharge battery is switched from the battery high in electric potential to the battery low in electric potential, the smoothing capacitor 16 temporarily becomes higher in electric potential than the discharge battery (the battery after switching). In this state, when the electricity control switch coupled to the discharge battery (the battery after switching) is set in the bidirectional conduction state, there occurs an electrical current flowing from the drive unit 10 into the discharge battery. This may cause an unsuitable influence on the batteries 41A and 41B. For example, an unsuitable influence may occur on the product life and the discharge performance of the batteries 41A and 41B.

Further, in the electric bicycle 1, the user is allowed to operate the input part 37 to switch the discharge battery from the battery (e.g., the first battery 41A) higher in remaining charge of the battery to the battery (e.g., the second battery 41B) lower in remaining charge. Owing to such switching, the user can preferentially use the battery (e.g., the battery 41B) lower in remaining charge of the battery to reduce the remaining charge of the battery to an amount suitable for charging. Such a switching operation resultantly changes the discharge battery from the battery (the battery 41B in the example described above) higher in electric potential to the battery (the battery 41A in the example described above) lower in electric potential. As a result, the smoothing capacitor 16 temporarily becomes higher in electric potential compared to the discharge battery (the battery after switching, that is, the battery 41A in the example described above).

Therefore, the switching execution section 38c temporarily sets the second electricity control switch 31B in the intermediate state (FIG. 6C) in the process of switching the discharge battery from the first battery 41A to the second battery 41B. Subsequently, when a comparative relationship between the electric potential of the drive unit 10 and the electric potential of the second battery 41B (the battery after switching) fulfills a predetermined condition, the switching execution section 38c sets the second electricity control switch 31B in the bidirectional conduction state. Thus, this operation prevents the electrical current from flowing from the electric potential of the drive unit 10 into the second battery 41B. The switching execution section 38c performs substantially the same processing when switching the discharge battery from the second battery 41B to the first battery 41A. This predetermined condition is hereinafter referred to as an "intermediate state termination condition."

It should be noted that the "electric potential of the drive unit 10" means, for example, an electric potential at the positive terminal of the connector for coupling the drive unit 10 and the battery switching device 30 to each other. In the example shown in the drawings, the drive unit 10 has the smoothing capacitor 16. The electric potential at the positive terminal of the drive unit 10 may be the electric potential at the positive terminal of the smoothing capacitor 16. Further, the "electric potential of the second battery 41B" means, for example, an electric potential at the positive terminal of a connector (a receptacle) for coupling the second battery 41B and the battery switching device 30 to each other. Further, the "electric potential of the first battery 41A" means, for example, an electric potential at the positive terminal of a connector (a receptacle) for coupling the first battery 41A and the battery switching device 30 to each other. Further, the "comparative relationship between the electric potential of the drive unit 10 and the electric potential of the second battery 41B" means the relative levels of the two electric potentials, or a difference therebetween.

In the example shown in FIG. 2, the battery switching device 30 has the voltage detectors 34A, 34B, and 34C. The switching execution section 38c detects the electric potentials (Vb) of the batteries 41A and 41B based on output signals of the voltage detectors 34A, 34B, and detects the electric potential (Vd) of the smoothing capacitor 16 based on an output signal of the voltage detector 34C. In the process of switching the discharge battery from the first battery 41A to the second battery 41B, the switching execution section 38c determines that the intermediate state termination condition described above has been fulfilled when, for example, the electric potential (Vb) of the second battery 41B has become equal to or higher than the electric potential (Vd) of the smoothing capacitor 16. In the process of switching the discharge battery from the second battery 41B to the first battery 41A, the switching execution section 38c determines that the intermediate state termination condition described above has been fulfilled when the electric potential (Vb) of the first battery 41A has become equal to or higher than the electric potential (Vd) of the smoothing capacitor 16.

The switching execution section 38c may determine whether or not the state in which the electric potentials (Vb) of the batteries 41A and 41B are equal to or higher than the electric potential (Vd) of the smoothing capacitor 16 lasts for a predetermined period of time. Then, the switching execution section 38c may determine that the intermediate state termination condition described above has been fulfilled when that state lasts for at least the predetermined period of time.

As described above, the intermediate state termination condition is, for example, that a relationship that inhibits the electric current from the drive unit 10 to the batteries 41A and 41B is established between the potential of drive unit 10 and the potential of the batteries 41A or 41B. The intermediate state termination condition may be that electric current is generated from the battery 41A or 41B (the battery after the switching) to the drive unit 10. Alternatively, the intermediate state termination condition may be that the duration of the intermediate state reaches a predetermined time. In addition to one of these conditions, the intermediate state end condition may include a condition about the state of the vehicle. The state of the vehicle may be, for example, the rotational speed of the crankshaft or the speed of the vehicle.

The intermediate state termination condition is not necessarily required to be "the electric potential (Vb) of the battery after switching is equal to or higher than the electric potential (Vd) of the smoothing capacitor 16," namely "a difference (Vb−Vd) between the electric potential (Vb) of the battery after switching and the electric potential (Vd) of the drive unit 10 is no lower than 0 (Vb−Vd≥0)." For example, the intermediate state termination condition can be "the difference (Vb−Vd) between the electric potential (Vb) of the battery after switching and the electric potential (Vd) of the smoothing capacitor 16 is higher than a negative threshold value (Vth<0) (Vb−Vd>Vth)." According to the above, the intermediate state termination condition can be fulfilled earlier.

Here, the threshold value Vth may be set based on a reverse current tolerated in the batteries 41A and 41B. (The reverse current is an electrical current flowing into the positive terminals of the batteries 41A and 41B.) Further, the threshold value Vth can be set based on the reverse current (Ia) tolerated in the batteries 41A and 41B and a resistance. For example, Vth=−(R1+R2+R3)×Ia (Ia>0) may be adopted.

Here, R1 denotes an internal resistance of each of the batteries 41A and 41B, R2 denotes a resistance of the power line for coupling the batteries 41A and 41B and the drive unit 10 to each other, and R3 denotes an internal resistance of the smoothing capacitor 16.

Further, the threshold value Vth may be set further taking an electrical current flowing from the smoothing capacitor 16 to the motor drive device 15 into consideration. In this case, the threshold value Vth may be smaller than "(R1+R2+R3)×Ia."

It should be noted that the switching execution section 38c is not required to detect the electric potential of the smoothing capacitor 16, and to detect the electric potential of the battery (the battery 41A or the battery 41B) after switching when making the determination. For example, it may be determined whether or not the intermediate state termination condition has been fulfilled based on the electrical currents on the power lines P1 and P2. Specifically, the switching execution section 38c is not necessarily required to directly detect the electric potentials (Vb and Vd), if the state in which the electric potential (Vb) of the battery after switching is equal to or higher than the electric potential (Vd) of the smoothing capacitor 16 is detected using a flow of the electrical current. The processing will be described later in detail.

[Flow of Processing]

FIG. 5 is a flowchart showing an example of the processing to be executed by the switching execution section 38c. The processing to be executed in the process of switching the discharge battery from the first battery 41A to the second battery 41B will hereinafter be described as an example with reference to FIG. 5 and FIG. 6A through FIG. 6E.

When the first battery 41A is selected as the discharge battery (i.e., before the commencement of the process of switching the battery), both of the first FET 33A and the second FET 33B of the first electricity control switch 31A are in the ON state (the bidirectional conduction state) as shown in FIG. 6A. In contrast, the first FET 33C and the second FET 33D of the second electricity control switch 31B are in the OFF state (the bidirectional inhibition state).

When the switching timing detector 38a has detected the timing of switching the discharge battery from the first battery 41A to the second battery 41B, the switching execution section 38c switches the first FET 33A of the first electricity control switch 31A to the OFF state as shown in FIG. 6B (S101). Further, the switching execution section 38c keeps the second FET 33B of the first electricity control switch 31A in the ON state. In other words, the first electricity control switch 31A makes the transition from the bidirectional conduction state to the intermediate state.

As described above, in the first FET 33A, the forward direction of the body diode 33a is set to a discharge direction of the battery 41A. Further, in the second FET 33B, the forward direction of the body diode 33b is opposite to that of the first FET 33A. Therefore, in the intermediate state shown in FIG. 6B, the electrical current from the first battery 41A flows through the body diode 33a of the first FET 33A and the channel of the second FET 33B.

Figure 6C:
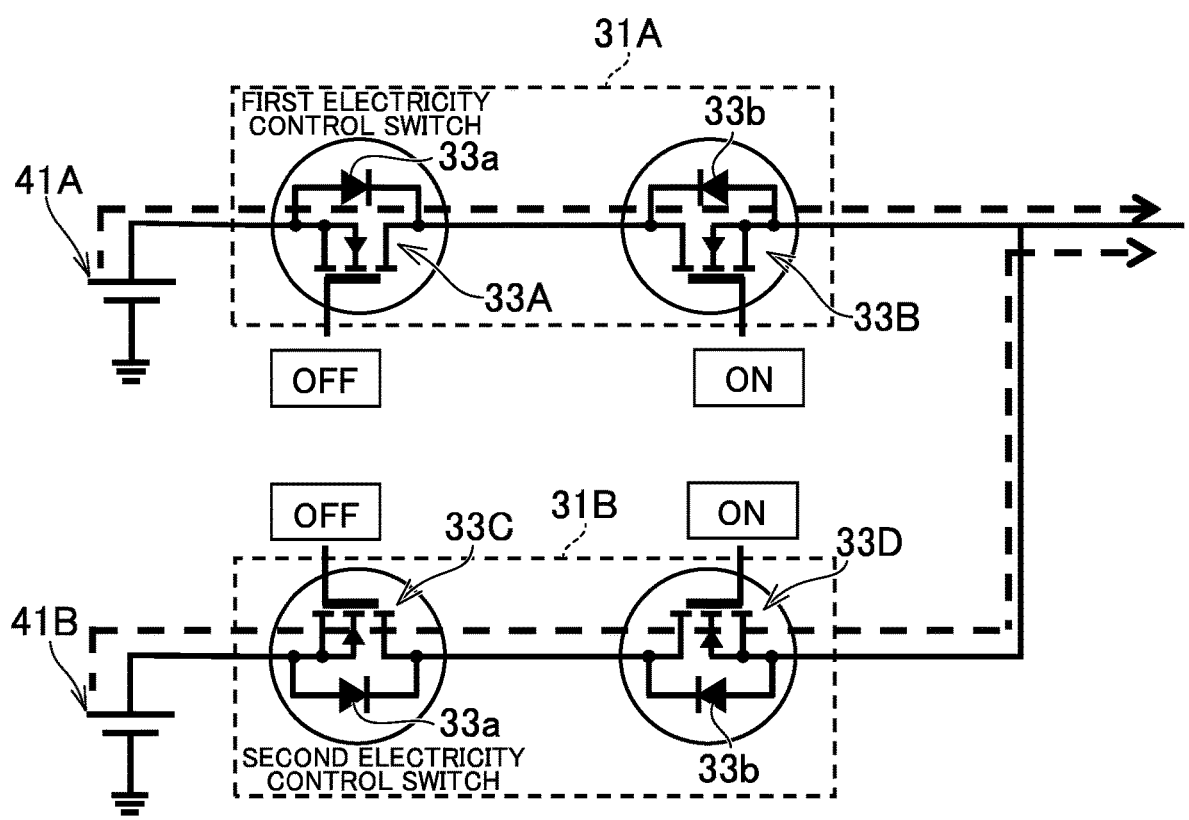
FIG. 6C is a diagram for explaining the process of switching the discharge battery from the first battery to the second battery.
Figure 6D:
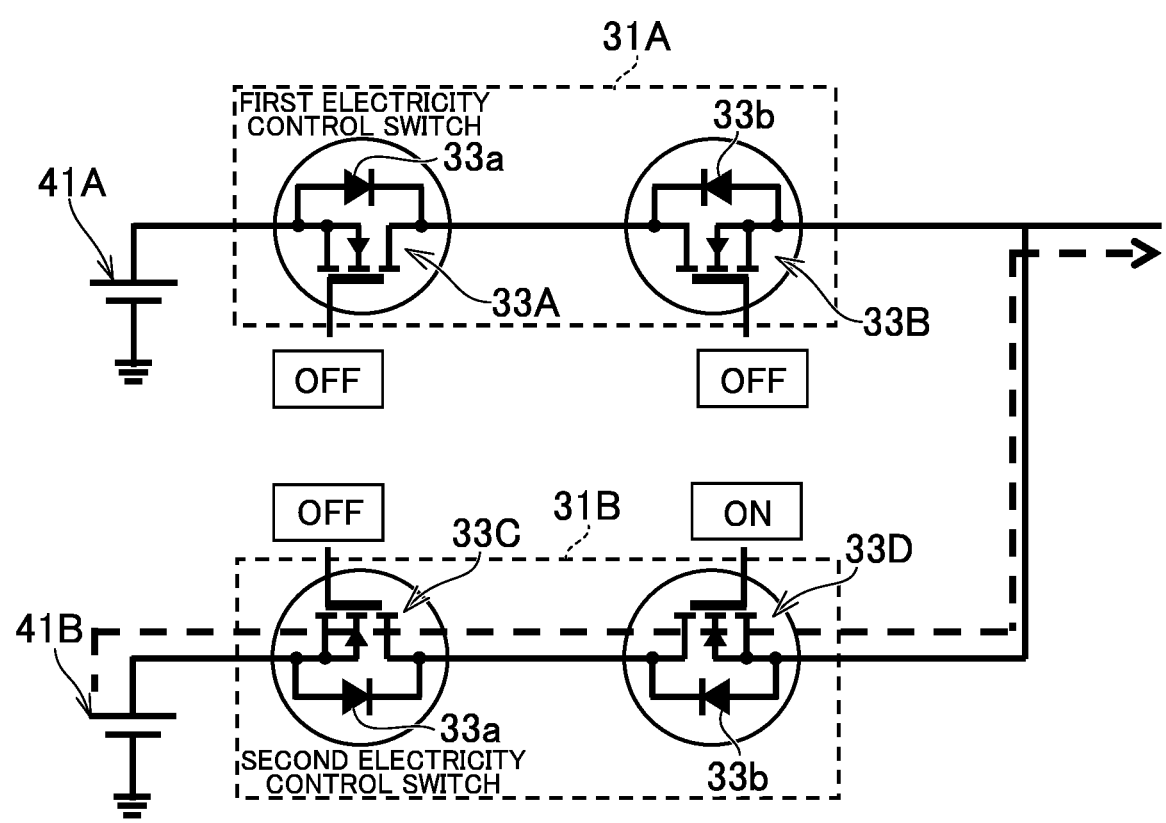
FIG. 6D is a diagram for explaining the process of switching the discharge battery from the first battery to the second battery.
Figure 6E:
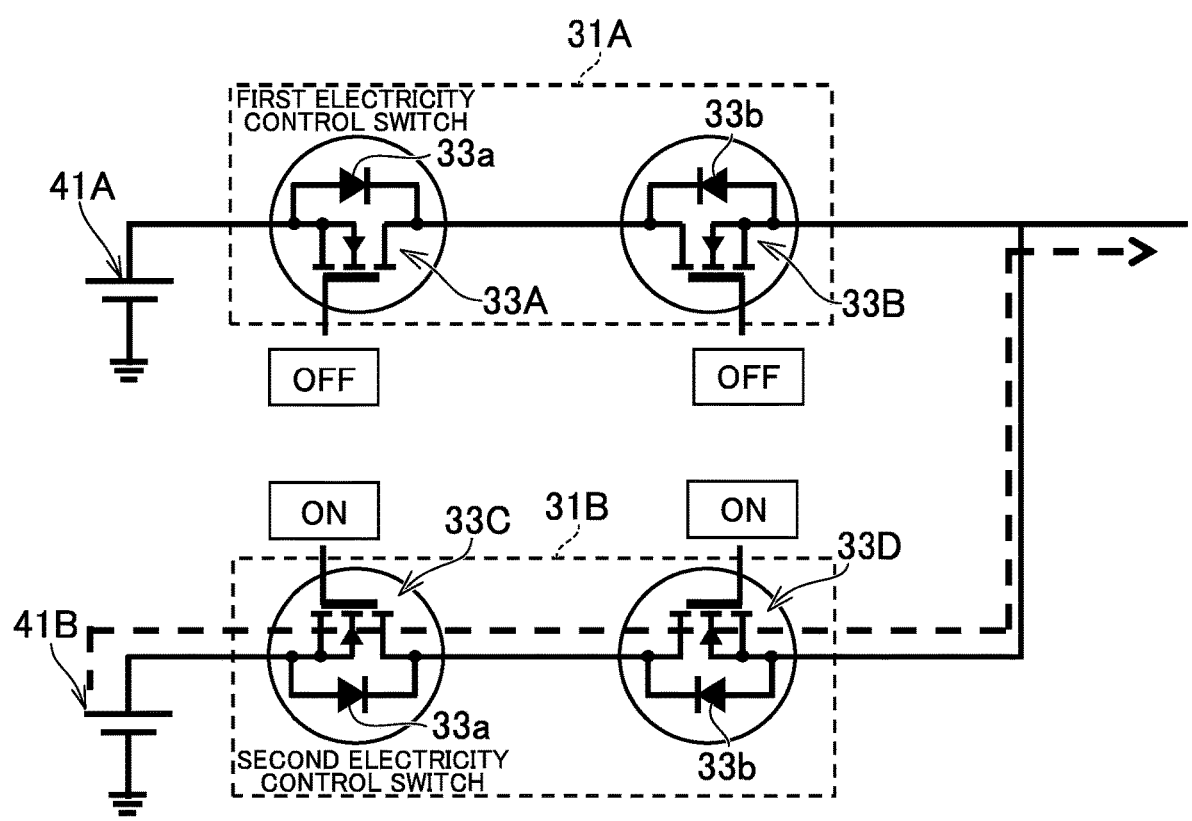
FIG. 6E is a diagram for explaining the process of switching the discharge battery from the first battery to the second battery.

Further, as shown in FIG. 6C, the switching execution section 38c switches the second FET 33D of the second electricity control switch 31B to the ON state (S102). On this occasion, the switching execution section 38c keeps the first FET 33C of the second electricity control switch 31B in the OFF state. In other words, the second electricity control switch 31B makes the transition from the bidirectional inhibition state to the intermediate state.

In the second FET 33D, the forward direction of the body diode 33b is the charge direction of the second battery 41B. In contrast, in the first FET 33C, the forward direction of the body diode 33a is a discharge direction of the second battery 41B. Therefore, in the intermediate state shown in FIG. 6C, the electrical current from the second battery 41B flows through the body diode 33a of the first FET 33C and the channel of the second FET 33D. It should be noted that in the state shown in FIG. 6C, when the electric potential of the first battery 41A is higher than the electric potential of the second battery 41B, the current supply from the first battery 41A to the drive unit 10 continues. In contrast, when the electric potential of the second battery 41B is higher than the electric potential of the first battery 41A, the current supply from the second battery 41B to the drive unit 10 starts.

As shown in FIG. 6D, the switching execution section 38c switches the second FET 33B of the first electricity control switch 31A to the OFF state (S103). Further, the switching execution section 38c keeps the first FET 33A of the first electricity control switch 31A in the OFF state. In other words, the first electricity control switch 31A makes the transition from the intermediate state to the bidirectional inhibition state. In contrast, the second electricity control switch 31B is kept in the intermediate state.

As described above, since the second electricity control switch 31B is set in the intermediate state before setting the first electricity control switch 31A in the bidirectional inhibition state, it is possible to prevent the current supply to the drive unit 10 from being interrupted. It should be noted that unlike the example shown in FIG. 5, the switching execution section 38c may perform the processing in S101 and the processing in S102 at the same time, or perform the processing in S102 prior to the processing in S101. Even in this case, it is possible to prevent the current supply to the drive unit 10 from being interrupted.

Then, the switching execution section 38c determines whether or not the comparative relationship between the electric potential of the smoothing capacitor 16 and the electric potential of the second battery 41B (the battery after switching) fulfills the intermediate state termination condition (S104). Specifically, the switching execution section 38c determines whether or not the electric potential (Vb) of the second battery 41B is equal to or higher than the electric potential (Vd) of the smoothing capacitor 16. The switching execution section 38c may determine whether or not the difference (Vb−Vd) between the electric potential (Vd) of the smoothing capacitor 16 and the electric potential (Vb) of the second battery 41B is higher than the negative threshold value (Vth). The switching execution section 38c repeats the processing in S104 until the intermediate state termination condition is fulfilled.

In the state shown in FIG. 6D, when the electric potential (Vd) of the smoothing capacitor 16 is higher than the electric potential (Vb) of the second battery 41B, the electrical current is supplied from the smoothing capacitor 16 to the motor drive device 15, and thus the electric potential of the smoothing capacitor 16 gradually drops. Then, when the electric potential of the smoothing capacitor 16 becomes equal to the electric potential of the second battery 41B, the current supply from the second battery 41B to the drive unit 10 starts.

In S104, when the intermediate state termination condition has been fulfilled, the switching execution section 38c switches the first FET 33C of the second electricity control switch 31B to the ON state as shown in FIG. 6E (S105). Thus, the second electricity control switch 31B makes the transition from the intermediate state to the bidirectional conduction state, and the switching process of the discharge battery is completed.

FIG. 5 and FIG. 6A through FIG. 6E describes the processing to be executed in the process of switching the discharge battery from the first battery 41A to the second battery 41B as an example. However, substantially the same processing can be executed in the process of switching the discharge battery from the second battery 41B to the first battery 41A. In this case, it is sufficient to read "first" and "second" in an opposite manner in the processing described above.

It should be noted that when the intermediate state termination condition is not fulfilled within a predetermined period of time, the switching execution section 38c may terminate the switching process of the discharge battery in the middle, and restore the electricity control switches 31A and 31B to the state (the state shown in FIG. 6A in the example shown in FIG. 6A through FIG. 6E) before starting the switching process. For example, when the battery switching instruction is input to the control device 38 via the input part 37 during the stoppage of the electric bicycle 1, a lot of time is required to discharge the smoothing capacitor 16. In such a case, there is a possibility that the intermediate state termination condition is not fulfilled within a predetermined period of time. In this case, the switching execution section 38c may terminate the switching process of the discharge battery in S104, and restore the electricity control switches 31A and 31B to the state before starting the switching process.

OTHER EXAMPLES

The present disclosure is not limited to the electric bicycle 1 and the battery switching device 30 described hereinabove.

Figure 7A:
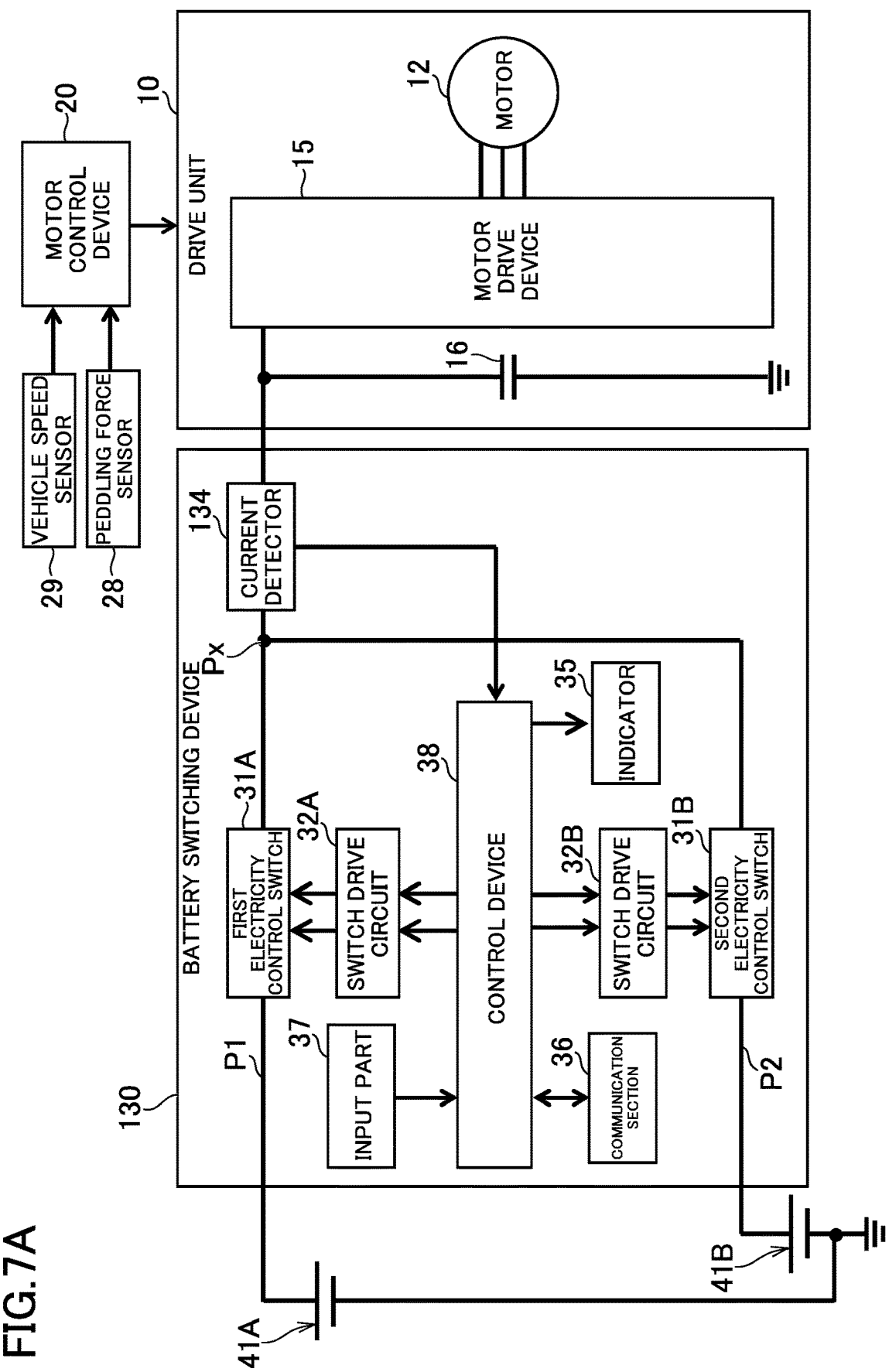
FIG. 7A is a diagram showing another example of the battery switching device.
Figure 7B:
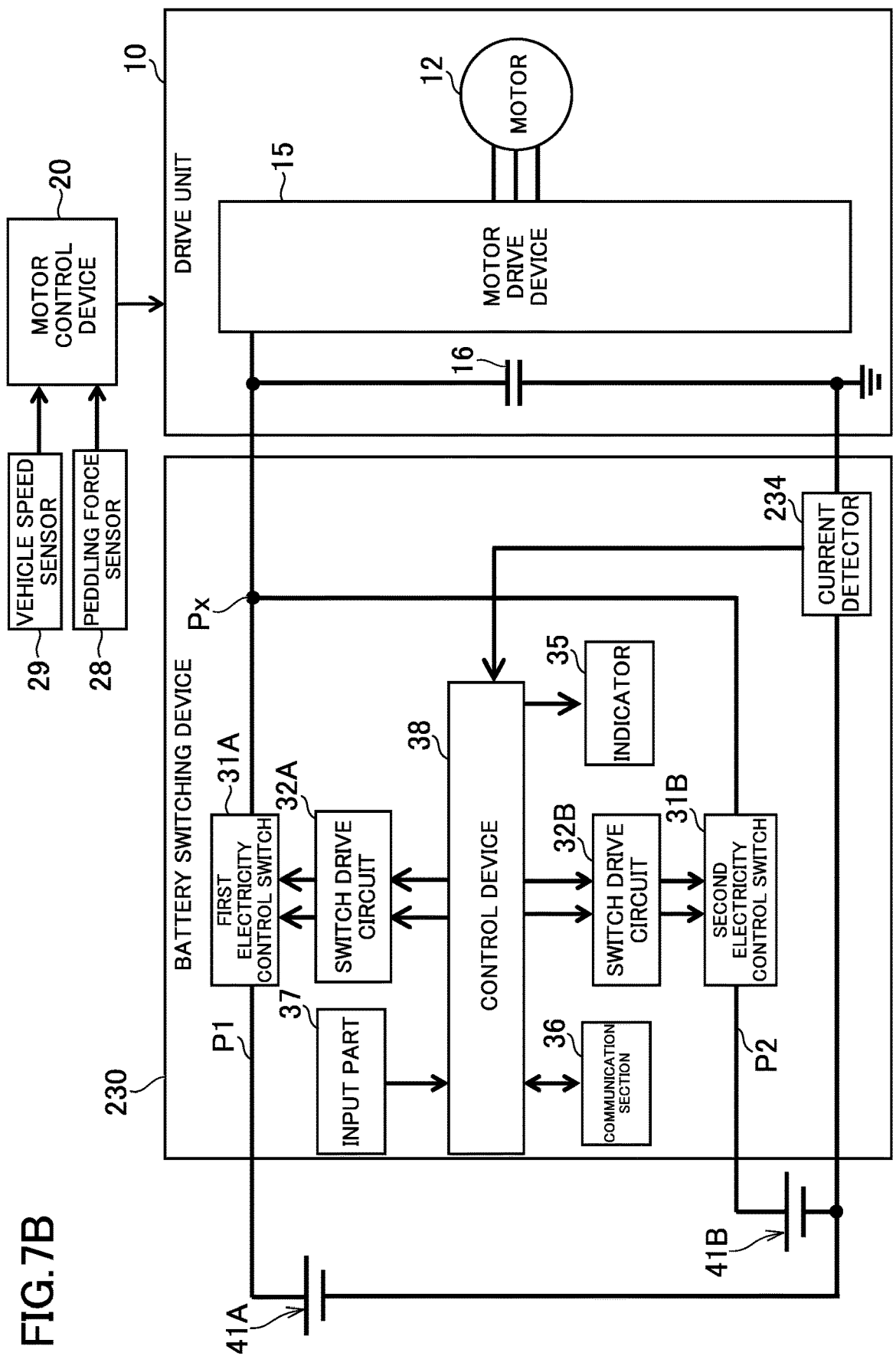
FIG. 7B is a diagram showing still another example of the battery switching device.

FIG. 7A and FIG. 7B are block diagrams showing other examples of the battery switching device proposed in the present disclosure. In FIG. 7A, a battery switching device 130 is shown as another example, and in FIG. 7B, a battery switching device 230 is shown as another example. In FIG. 7A and FIG. 7B, the same elements as in the battery switching device 30 described hereinabove are denoted by the same reference symbols.

First, the battery switching device 130 will be described with a focus on differences from the battery switching device 30 with reference to FIG. 7A. Matters which are not described with respect to the battery switching device 130 may be the same as in the battery switching device 30.

As shown in FIG. 7, the battery switching device 130 has a current detector 134 instead of the voltage detectors 34A, 34B, and 34C. The current detector 134 is a circuit for outputting a signal corresponding to the electrical current to be supplied from the batteries 41A and 41B to the drive unit 10. The current detector 134 is disposed between the positive terminals of the batteries 41A and 41B and the positive terminal of the smoothing capacitor 16. Further, the current detector 134 may be disposed closer to the smoothing capacitor 16 than to the coupling point Px of the power line P1 and the power line P2. In either of the cases in which an electrical current flows from the battery 41A to the drive unit 10 or in which an electrical current flows from the battery 41B to the drive unit 10, the current detector 134 outputs a signal corresponding to the current value.

The intermediate state termination condition described above is, for example, "the electric potential of the battery after switching is equal to or higher than the electric potential of the smoothing capacitor 16." In the state shown in FIG. 6D, it is not until the electric potential of the second battery 41B (the battery after switching) is equal to or higher than the electric potential of the smoothing capacitor 16 that the electrical current is supplied from the battery after switching to the drive unit 10. Therefore, the switching execution section 38c may determine whether or not the intermediate state termination condition has been fulfilled based on the signal output from the current detector 134. Further, when the current supply from the second battery 41B to the drive unit 10 starts, the switching execution section 38c determines that the intermediate state termination condition described above is fulfilled ("Yes" in S104 shown in FIG. 5), and makes the transition of the second electricity control switch 31B from the intermediate state to the bidirectional inhibition state (S105 shown in FIG. 6).

Then, the battery switching device 230 will be described with a focus on differences from the battery switching device 30 with reference to FIG. 7B. Matters which are not described with respect to the battery switching device 230 may be the same as in the battery switching devices 30 and 130.

The battery switching device 230 has a current detector 234. The current detector 234 is disposed between negative terminals of the batteries 41A and 41B and the ground. In the example shown in the drawings, the negative terminals of the batteries 41A and 41B and the negative terminal of the smoothing capacitor 16 are coupled to the common ground. Therefore, similarly to the current detector 134 shown in FIG. 7A, in either of the cases in which an electrical current flows from the battery 41A to the drive unit 10 or in which an electrical current flows from the battery 41B to the drive unit 10, the current detector 234 can output a signal corresponding to the electrical current.

The switching execution section 38c may determine whether or not the intermediate state termination condition is fulfilled based on the output of the current detector 234. The switching execution section 38c may determine that the intermediate state termination condition has been fulfilled when the switching execution section 38c has detected the electrical current returning from the ground to the negative terminals of the batteries 41A and 41B. In other words, the switching execution section 38c may determine that the electric potential of the positive terminal of the second battery 41B (the battery after switching) has become higher than the electric potential of the positive terminal of the smoothing capacitor 16.

In a situation where the switching from the battery lower in electric potential to the battery higher in electric potential is performed, a problem of the inflow of the electrical current from the smoothing capacitor 16 into the batteries 41A and 41B would not occur. Therefore, the control device of the battery switching device may change the procedure for switching the discharge battery in accordance with the aspect of the switching of the discharge battery. According to such processing as described above, the time necessary for the switching of the discharge battery can be shortened, and thus, heat generation due to the body diodes 33a of the first FETs 33A and 33C for the battery higher in electric potential can be reduced.

Figure 8:
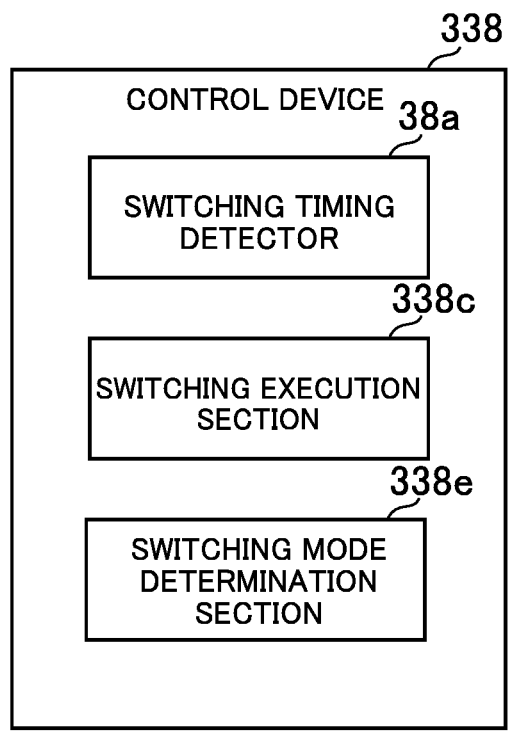
FIG. 8 is a diagram showing another example of the processing performed by the control device.

FIG. 8 is a block diagram showing functions provided to an example of the control device for executing such processing as described above. The control device 338 has a switching execution section 338c and a switching mode determination section 338e in addition to the switching timing detector 38a described above.

When the switching timing detector 33a has detected the switching timing of the discharge battery, the switching mode determination section 338e determines whether the switching of the discharge battery is switching from the battery higher in electric potential to the battery lower in electric potential, or switching from the battery lower in electric potential to the battery higher in electric potential.

The switching execution section 338c has two modes as the switching procedure of the discharge battery. A first switching mode is the switching process described with reference to FIG. 5. Specifically, in the first switching mode, the discharge battery (the second battery 41B in the example shown in FIG. 5 and FIG. 6A through FIG. 6E) after switching is set in the intermediate state, and then after the intermediate state termination condition has been fulfilled in S104, the discharge battery after switching is set in the bidirectional conduction state (S105).

In contrast, a second switching mode is a mode in which the discharge battery is switched without going through the determination process in S104. Specifically, the switching execution section 338c sets both of the discharge battery before switching and the discharge battery after switching in the intermediate state (S101 and S102). Then, the switching execution section 338c sets, in the OFF state, the second FET (the second FET 33B in FIG. 5) of the electricity control switch coupled to the discharge battery before switching (the first battery 41A in the example shown in FIG. 5) (S103). Further, the switching execution section 338c sets, in the ON state, the first FET (the first FET 33C in FIG. 5) of the electricity control switch coupled to the discharge battery after switching (the second battery 41B in the example shown in FIG. 5) (S105). In the second switching mode, S104 is not executed.

When the discharge battery is switched from the battery higher in electric potential to the battery lower in electric potential, the switching execution section 338c executes the first switching mode. In contrast, when the discharge battery is switched from the battery lower in electric potential to the battery higher in electric potential, the switching execution section 338c executes the second switching mode.

CONCLUSION (1) In the electric bicycle 1, the electricity control switches 31A and 31B have the bidirectional conduction state (the state of the first electricity control switch 31A shown in FIG. 6A, the state of the second electricity control switch 31B shown in FIG. 6E) that allows both of the electrical current flowing to the drive unit 10 from the batteries 41A and 41B to which the electricity control switches 31A and 31B are coupled, and the electrical current flowing from the drive unit 10 to the batteries 41A and 41B. The electricity control switches 31A and 31B have the intermediate state (the state of the first electricity control switch 31A and the second electricity control switch 31B shown in FIG. 6C) that allows the electrical current flowing to the drive unit 10 from the batteries 41A and 41B to which the electricity control switches 31A and 31B are coupled, and that inhibits the electrical current flowing from the drive unit 10 to the batteries 41A and 41B. The electricity control switches 31A and 31B have the bidirectional inhibition state (the state of the first electricity control switch 31A shown in FIG. 6E, the state of the second electricity control switch 31B shown in FIG. 6A) that inhibits both of the electrical current flowing to the drive unit 10 from the batteries 41A and 41B to which the electricity control switches 31A and 31B are coupled, and the electrical current flowing from the drive unit 10 to the batteries 41A and 41B. The control device 38 sets the second electricity control switch 31B in the intermediate state in the process of switching the discharge battery from the first battery 41A to the second battery 41B. Subsequently, when the comparative relationship between the electric potential of the drive unit 10 (specifically, the electric potential of the smoothing capacitor 16) and the electric potential of the second battery 41B fulfills the intermediate state termination condition, the control device 38 sets the second electricity control switch 31B in the bidirectional conduction state. According to the electric bicycle 1, it is possible to prevent the electrical current flowing from the drive unit 10 to the second battery 41B when switching the discharge battery.

(2) In the example shown in FIG. 7A and FIG. 7B, the electric bicycle 1 has the current detectors 134 and 234 for detecting the electrical current flowing between the second battery 41B and the drive unit 10. The control device 38 determines whether or not the comparative relationship between the electric potential of the drive unit 10 and the electric potential of the second battery 41B has fulfilled the intermediate state termination condition based on the output of the current detectors 134 and 234.

(3) In the example shown in FIG. 2, the electric bicycle 1 has the voltage detector 34B for detecting the electric potential of the second battery 41B, and the voltage detector 34C for detecting the electric potential of the drive unit 10. The control device 38 determines whether or not the comparative relationship between the electric potential of the drive unit 10 and the electric potential of the second battery 41B fulfills the intermediate state termination condition based on the output of the voltage detector 34B and the output of the voltage detector 34C.

(4) The intermediate state termination condition is that, for example, the difference between the electric potential of the drive unit 10 and the electric potential of the second battery 41B is smaller than the threshold value (Vth>0). According to the above, it becomes possible to reduce the time required for the intermediate state termination condition to be fulfilled.

(5) The intermediate state termination condition is, for example, when the electric potential of the second battery 41B becomes higher than the electric potential of the drive unit 10.

(6) The control device 38 changes the first electricity control switch 31A from the bidirectional conduction state to the intermediate state, and at the same time changes the second electricity control switch 31B from the bidirectional inhibition state to the intermediate state in the process of switching the discharge battery from the first battery 41A to the second battery 41B. According to the above, it is possible to prevent the current supply to the drive unit 10 from being interrupted.

(7) The drive unit 10 can be provided with the smoothing capacitor 16 coupled in parallel to the motor drive device 15. According to the above, it is possible to reduce a fluctuation of the electrical current supplied to the motor drive device 15.

(8) The battery switching device 30 has the input part 37 for the user to operate. The control device 38 is allowed to switch the discharge battery between the first battery 41A and the second battery 41B based on the signal input from the input part 37. According to the above, it becomes easy for the user to preferentially use, for example, one of the batteries to reduce the remaining charge of the battery to the amount suitable for charging.

(9) The electricity control switches 31A and 31B respectively include the first FETs 33A and 33C for allowing, in the ON state thereof, the electrical current from the drive unit 10 to the batteries 41A and 41B that are respectively connected to the electricity control switches 31A and 31B, and include the second FETs 33B and 33D for allowing, in the ON state thereof, the electrical current to the drive unit 10 from the batteries 41A and 41B that are respectively connected to the electricity control switches 31A, 31B. The first FETs 33A and 33C and the second FETs 33B and 33D may be arranged in series to each other so that the forward directions of the body diodes 33a and 33b thereof become opposite to each other. According to the above, since the intermediate state can be realized using the body diodes 33a and 33b, it is possible to reduce the number of components.

It should be noted that the electric bicycle and the battery switching device proposed in the present disclosure are not limited to the examples described hereinabove.

For example, the electricity control switches 31A and 31B can be constituted by other elements such as insulated gate bipolar transistors (IGBT) instead of the FETs 33A through 33D. In this case, the electricity control switches 31A and 31B may include diodes (a pair of diodes having the forward directions opposite to each other) corresponding to the body diodes 33a and 33b of the FETs 33A through 33D.

Further, the drive unit 10 is not necessarily required to have the smoothing capacitor 16. Even in this case, it is possible to keep the OFF state of the first FETs 33A and 33C coupled to the discharge battery after switching until the intermediate state termination condition is fulfilled. In this way, for example, it is possible to prevent a regeneration current from the electric motor 12 from flowing into the discharge battery after switching.

In still another example, the battery switching device 30 is not required to have the input part 37 for the user to operate. In this case, the switching timing detector 38a may detect the switching timing of the discharge battery based on the states of the batteries 41A and 41B.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An electric bicycle comprising:
a first battery;
a second battery;
a drive unit including an electric motor; and
a battery switching device arranged between the first battery and the second battery, and the drive unit, wherein
the battery switching device includes: a first electricity control switch disposed between the first battery and the drive unit, a second electricity control switch disposed between the second battery and the drive unit, and a control device configured to control the first electricity control switch and the second electricity control switch,
the second electricity control switch is configured to include a bidirectional conduction state, an intermediate state, and a bidirectional inhibition state, where the bidirectional conduction state allows both of an electrical current flowing from the second battery to the drive unit and an electrical current flowing from the drive unit to the second battery, the intermediate state allows the electrical current flowing from the second battery to the drive unit and inhibits the electrical current flowing from the drive unit to the second battery, and the bidirectional inhibition state inhibits both of the electrical current flowing from the second battery to the drive unit and the electrical current flowing from the drive unit to the second battery, and in a process of switching a battery that supplies the drive unit with an electrical current from the first battery to the second battery, the control device is configured to set the second electricity control switch to the intermediate state, and then set the second electricity control switch to the bidirectional conduction state when a comparative relationship between an electric potential of the drive unit and an electric potential of the second battery fulfills a predetermined condition.

2. The electric bicycle according to claim 1, further comprising:
a current detector configured to detect an electrical current flowing between the second battery and the drive unit, wherein
the control device is configured to determine whether or not the comparative relationship between the electric potential of the drive unit and the electric potential of the second battery fulfills the predetermined condition based on an output of the current detector.

3. The electric bicycle according to claim 1, further comprising:
a battery voltage detector configured to detect the electric potential of the second battery; and
a drive unit voltage detector configured to detect the electric potential of the drive unit, wherein
the control device determines whether or not the comparative relationship between the electric potential of the drive unit and the electric potential of the second battery fulfills the predetermined condition based on an output of the battery voltage detector and an output of the drive unit voltage detector.

4. The electric bicycle according to claim 3, wherein
the predetermined condition is that a difference between the electric potential of the drive unit and the electric potential of the second battery is smaller than a threshold value.

5. The electric bicycle according to claim 1, wherein
the predetermined condition is that the electric potential of the second battery is equal to the electric potential of the drive unit, or higher than the electric potential of the drive unit.

6. The electric bicycle according to claim 1, wherein
in the process of switching the battery that supplies the drive unit with the electrical current from the first battery to the second battery, the control device is configured to change the first electricity control switch from the bidirectional conduction state to the intermediate state, and change the second electricity control switch from the bidirectional inhibition state to the intermediate state.

7. The electric bicycle according to claim 1, wherein
the drive unit has a motor drive device configured to supply the electric motor with an electrical current, and a smoothing capacitor coupled in parallel to the motor drive device.

8. The electric bicycle according to claim 1, further comprising:
an input part for a user to operate, wherein the control device is configured to switch the battery that supplies the drive unit with an electrical current between the first battery and the second battery based on a signal input from the input part.

9. The electric bicycle according to claim 1, wherein
each of the first electricity control switch and the second electricity control switch includes a first field effect transistor (a first FET) configured to allow the electrical current from the battery to the drive unit in an ON state, and a second field effect transistor (a second FET) configured to allow the electrical current from the drive unit to the battery in an ON state, and
the first FET and the second FET are arranged in series so that forward directions of body diodes of the first FET and the second FET are opposite to each other.

10. A battery switching device to be arranged between a first battery and a second battery, and a drive unit of an electric bicycle, the battery switching device comprising:
a first electricity control switch disposed between the first battery and the drive unit;
a second electricity control switch disposed between the second battery and the drive unit; and
a control device configured to control the first electricity control switch and the second electricity control switch, wherein
the second electricity control switch has
a bidirectional conduction state that allows both of an electrical current flowing from the second battery to the drive unit and an electrical current flowing from the drive unit to the second battery,
an intermediate state that allows the electrical current flowing from the second battery to the drive unit, and inhibits the electrical current flowing from the drive unit to the second battery, and
a bidirectional inhibition state that inhibits both of the electrical current flowing from the second battery to the drive unit and the electrical current flowing from the drive unit to the second battery, and
in a process of switching a battery that supplies the drive unit with an electrical current from the first battery to the second battery, the control device is configured to set the second electricity control switch to the intermediate state, and then set the second electricity control switch to the bidirectional conduction state when a comparative relationship between an electric potential of the drive unit and an electric potential of the second battery fulfills a predetermined condition.

11. A method of switching a battery that supplies a drive unit with an electrical current from a first battery to a second battery in an electric bicycle, the electric bicycle including the first battery, the second battery, the drive unit, a first electricity control switch, and a second electricity control switch, the first electricity control switch being disposed between the first battery and the drive unit, and the second electricity control switch being disposed between the second battery and the drive unit,
the method comprising:
making a transition of the second electricity control switch from a bidirectional inhibition state to an intermediate state, where the bidirectional inhibition state inhibits both of an electrical current flowing from the second battery to the drive unit and an electrical current flowing from the drive unit to the second battery, where the intermediate state allows the electrical current flowing from the second battery to the drive unit and inhibits the electrical current flowing from the drive unit to the second battery; and making a transition of the second electricity control switch from the intermediate state to a bidirectional conduction state, where the bidirectional conduction state allows both of the electrical current flowing from the second battery to the drive unit and the electrical current flowing from the drive unit to the second battery when a comparative relationship between an electric potential of the drive unit and an electric potential of the second battery fulfills a predetermined condition.

* * * * *